March 29, 1927.
B. P. SUTHERLAND
POTATO FEEDER
Filed Dec. 21, 1925
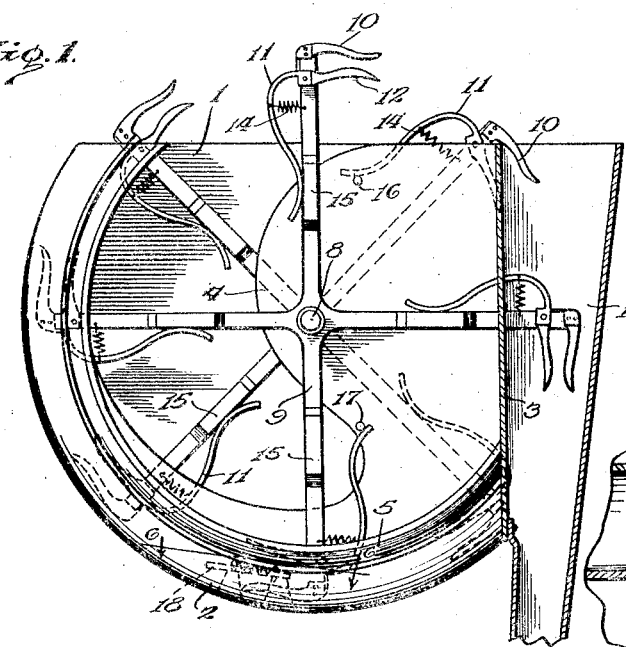
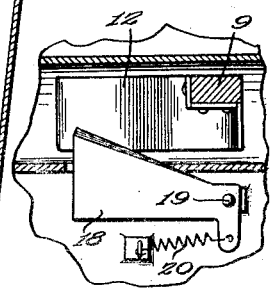
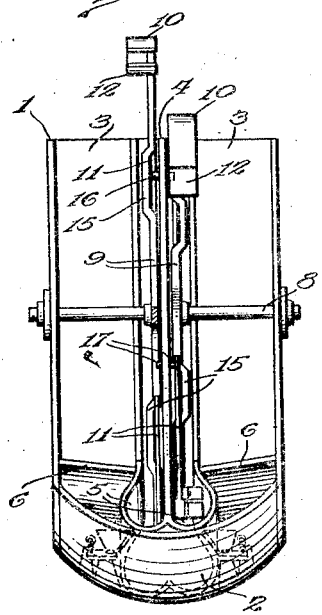
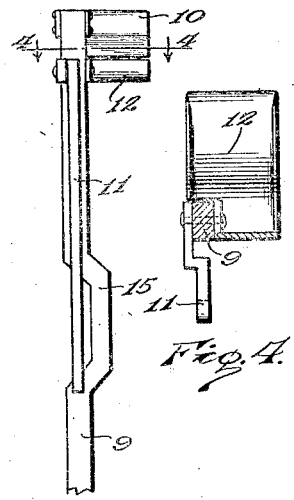
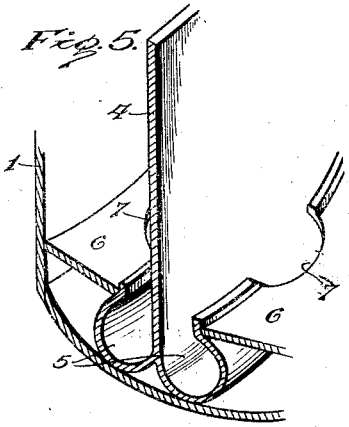
Inventor
B. P. Sutherland
By
Attorneys Patented Mar. 29, 1927.

1,622,686

UNITED STATES PATENT OFFICE.

BAINBRIDGE P. SUTHERLAND, OF DEL NORTE, COLORADO.

POTATO FEEDER.

Application filed December 21, 1925. Serial No. 76,799.

This invention relates to potato planters and has special reference to the hopper and means for transferring the potatoes singly from the hopper to a delivery spout or chute through which they pass to the ground. The invention has for its object the provision of a simple and efficient mechanism which may be operated by the travel of the planter along the contemplated row to transfer the potatoes one at a time from the hopper to the chute or delivery spout and which will be automatically actuated to take up a potato and to release the same as it is brought into a position at the top of the delivery spout. A further object of the invention is to provide mechanism comprising a plurality of traveling clamps or cups which will be automatically opened as they aproach the bottom of the hopper to engage a potato and then closed upon the potato to hold it and carry it to a point at the top of the discharge chute at which point it will be automatically released. Other incidental objects of the invention will appear in the course of the following description.

In the drawing:

Figure 1 is a side elevation with one side wall of the hopper removed;

Fig. 2 is a rear end elevation with the discharge spout removed;

Fig. 3 is an enlarged elevation of one of the rotating arms which carry the potato holding cups or clamps;

Fig. 4 is a detail section on the line 4—4 of Fig. 3;

Fig. 5 is an enlarged perspective view of a portion of the rear end of the hopper.

Figure 6 is an enlarged detail sectional view on the line 6—6 of Figure 1 looking in the direction of the arrows.

In the drawing, I have illustrated only the hopper and the parts mounted therein which constitute my present invention, but it is to be understood that the hopper is to be secured upon a frame of any approved construction, which frame may be wheel-supported so that it may be easily drawn along the row where the potatoes are to be planted, and the mechanism of the invention may be driven from one of the wheels or otherwise actuated to effect the delivery of the potatoes to the ground.

In carrying out the invention, I employ a hopper consisting of side walls 1 having straight top and rear edges, as shown clearly in Fig. 1, and having its lower and front edges merged upon an arc, as also shown in Fig. 1. The top of the hopper is open while a bottom 2 is secured to the lower and front edges of the side walls and back plates 3 are secured to the side walls at the rear edges of the same. The back plates 3 extend inwardly from the side walls or plates 1 of the hopper but are spaced apart at their inner edges to provide for the passage of the potato-carrying arms, and a partition 4 is disposed between the inner edges of the said back plates and in spaced relation thereto so that the hopper may accommodate two sets of arms, one disposed on each side of the partition. The lower edge of the partition merges into troughs 5 which extend longitudinally over the bottom of the hopper and are adapted to guide the potato-engaging cups or clamps and also furnish means whereby the potatoes will be naturally disposed in the parts of the cups. False bottoms 6 are provided above the bottom 2 and extend from the side plates to the upper edges of the troughs, as shown most clearly in Fig. 5, being provided at intervals with openings 7 through which the potatoes may pass. As shown most clearly in Fig. 1, the partition projects forwardly within the hopper a sufficient distance to provide an intermediate bearing for a shaft 8 which carries the potato-dropping arms 9, the end portions of the said shaft being rotatably mounted in the side plates 1 of the hopper and either or both ends being equipped with any desired means for imparting rotation to the shaft. As shown in Fig. 1, the arms 9 are disposed radially of the shaft and are arranged in two sets or series, one set being disposed at each side of the partition. The arms are of such length that their outer ends may travel in the respective troughs 5, and to the outer extremity of each arm is secured a stationary jaw or cup member 10, said jaw or cup member projecting forwardly from the arm in the direction of rotation. Pivotally mounted upon each arm 9, immediately adjacent the outer end thereof, is a trip rod or lever 11, and formed integral with or rigidly secured to the pivoted end of the said trip lever is a rocking jaw or cup member 12 adapted to cooperate with the cup member or jaw 10 to hold a potato and deposit it in the discharge chute or spout 13 which is secured upon the rear end of the hopper and may be of any approved form, the chute depending to a point adjacent the ground, as will be understood. Extending between and secured to each trip lever 11 and the arm 9 upon which said lever is mounted is a tension spring 14 which holds the inner free end of the lever to the arm, and the arm is offset, as shown at 15, to clear a stud or trip pin 16 and a similar stud or trip pin 17 upon the partition so that the rotation of the arm will bring the free inner end of the lever against the said trip pins successively to actuate the rocking jaw or cup member 12. It will also be noted that the free end of the lever is curved so that a convex surface is presented to the studs 16 and 17 and the engagement of the studs by the lever made easy and the operation of the device certain.

In use, the hopper is filled with potatoes or the potatoes may be fed into the hopper as the machine travels over the field through any approved mechanism. During the travel of the machine, the shaft 8 will be rotated so that the several arms will partake of the rotation and the potato-engaging clamps will be caused to travel through the troughs 5 and across the top of the hopper to the delivery spout or chute 13. As an arm 9 passes the lower trip stud 17, the trip lever 11 on that arm will be brought against the said stud so that the lever will be rocked and the jaw 12 thereon will be moved away from the jaw 10 on the arm. The jaws while thus separated will enter the respective troughs 5 into which the potatoes have gravitated and will be thereupon brought into position at opposite sides of a potato. As the travel of the arm continues, the lever will clear the trip pin or stud and the tension spring connected with the lever will at once swing the rocking jaw toward the relatively fixed jaw to hold a potato between the jaws. The arm then moves forwardly and upwardly through the hopper and eventually will travel rearwardly at the top of the hopper to a point adjacent the top of the discharge chute 13. Just as the clamp reaches the top of the chute, the trip lever will be brought into engagement with the trip stud 16 and will be thereby retarded, relative to the arm 9, so that it will be rocked and the movable jaw will be swung away from the relatively fixed jaw to release the potato which will then, of course, drop through the chute to the ground. When the lever clears the trip pin 16, the clamp will resume its initial closed position but almost immediately the trip stud 17 will be engaged to again open the jaws so that they may again engage a potato.

From the foregong description, taken in connection with the accompanying drawing, it will be seen that I have provided a very compact and efficient mechanism whereby potatoes will be taken up singly and delivered into the discharge spout so that they will be set in the ground at regular intervals. Any number of rotating arms may be employed, and while I have shown them as disposed in two sets one at each side of an intermediate partition, they may be disposed in one set and the hopper made narrower so that the intermediate partition will be unnecessary and the trip pins may be set in one side wall of the hopper.

A retarding member 18 is associated with each of the hoppers to temporarily hold the pieces of potato in the path of the pickers to insure the latter taking up a potato and prevents the picker from pushing the potato ahead without picking one. The retarding member consists of an arm 18 which is pivoted at one end to a side of the hopper or other convenient point, as indicated at 19. The arm is broad to prevent the potatoes from lodging in the rear thereof when at the limit of its inward movement. A spring 20 coacts with the arm to normally hold it at the limit of its inward movement. The swinging end of the arm 18 is moved outward against the tension of the spring 20 by the pickers as their gripping ends sweep through the hopper and pass the inner end of the arm.

Having thus described the invention, I claim:

1. In a potato planter, the combination of a hopper, arms provided to travel through the hopper and having an offset, fixed and pivoted jaws at the ends of the arms, the pivoted jaws having levers extending across the spaces of the arms provided by the offset portions thereof, and trips disposed in the path of the levers and the said spaces of the arms.

2. A potato planter comprising a hopper of approximately circular outline including straight sides and an outwardly curved bottom, a partition midway between the sides of the hopper, circular troughs at opposite sides of the partition in contact with and supported by the said curved bottom, false bottoms between the open sides of the troughs and the sides of the hopper inclining outwardly and upwardly, back plates extending inwardly from the sides of the hopper and terminating short of the partition, a chute in the rear of the back plates, a shaft mounted in the sides of the hopper, arms radiating from the shaft and disposed upon opposite sides of the partition, fixed and pivoted jaws on the outer ends of the arms and means for operating the pivoted jaws.

In testimony whereof I affix my signature.

BAINBRIDGE P. SUTHERLAND. [L. S.]